United States Patent [19]

Jacobsson et al.

[11] 4,325,702
[45] Apr. 20, 1982

[54] ADJUSTABLE PULLEY

[75] Inventors: Kurt A. G. Jacobsson, Ulricehamn; Lars H. G. Tholander, Huskvarna; Ulf-Erik Wide, Åsunden, all of Sweden

[73] Assignee: Aktiebolaget IRO, Ulricehamn, Sweden

[21] Appl. No.: 87,832

[22] Filed: Oct. 24, 1979

[30] Foreign Application Priority Data

Oct. 24, 1978 [DE] Fed. Rep. of Germany ....... 2846279

[51] Int. Cl.$^3$ .............................................. F16H 55/54
[52] U.S. Cl. ...................................................... 474/56
[58] Field of Search ....................... 424/47, 48, 49, 56, 424/57; 66/132 R, 132 T

[56] References Cited

U.S. PATENT DOCUMENTS

| | | | |
|---|---|---|---|
| 672,962 | 4/1901 | Seymour | 474/56 X |
| 813,651 | 2/1906 | Ladd | 474/56 X |
| 3,243,091 | 3/1966 | Rosen | 474/56 X |
| 3,661,024 | 5/1972 | Cooke | 474/56 |
| 4,068,539 | 1/1978 | Nye | 474/56 X |

FOREIGN PATENT DOCUMENTS

| | | | |
|---|---|---|---|
| 978916 | 4/1951 | France | 474/56 |
| 2236393 | 1/1975 | France . | |
| 7806 | 9/1895 | Sweden | 474/56 |

Primary Examiner—Allan D. Hermann
Attorney, Agent, or Firm—Blanchard, Flynn, Thiel, Boutell & Tanis

[57] ABSTRACT

A pulley with a variable working diameter, including two coaxial disks which are rotatable relative to one another, of which the one has a radial and the other at least one spiral-shaped guide groove. A plurality of support members with a segmentlike form are positioned between the disks and can be clamped with their front sides between the disks in different radial positions so that their radially outer peripheral areas define a polygonal path which is similar to a circle. The support members having projections engaged in the guide grooves of both disks so that relative rotation of the disks moves the support members radially for changing the respective circle diameter. Each support member—viewed in the direction of the axis of rotation of the disks—has the shape of an asymmetrical segment, preferably a circular-ring segment, with a longer and a shorter diagonal. An extension of the longer diagonal is spaced from but passes by on the same side of the axis of rotation of the disks as a perpendicular to a tangent on the spiral-shaped guide groove in the area of the support member.

11 Claims, 5 Drawing Figures

ADJUSTABLE PULLEY

FIELD OF THE INVENTION

The invention relates to an improved adjustable pulley.

BACKGROUND OF THE INVENTION

An adjustable pulley is known from German Pat. No. 1 286 680. The support members which with their back areas define the circular-ring-shaped working diameter, have the design of symmetrical circular-ring segments. Each segment is divided into two equal halves by the radial plane which is defined by the associated radial guide groove. By rotating the disk, which has the spiral-shaped guide grooves, with respect to the disk which has the radial guide grooves, the segments are moved in the radial area which is defined by the disk diameters. This known pulley has proven to be excellent in practice. However, a limitation in its use results from the fact that, through the use of the symmetrical circular-ring segments as support members the pulley can not be adjusted for a very small working diameter. For this purpose the segments are extended too long in the radial direction in order to be guided sufficiently stable during adjusting movements between the disks. This disadvantage, that through this a small working diameter could not be achieved and only a low speed relationship between smallest and largest working diameter could be achieved, had to be accepted in view of a satisfactory functioning of the pulley during the adjustment.

A pulley which is variable in diameter is also known from German OS No. 20 30 334, the segments of which are symmetrical, namely their straight side flanks extend radially with respect to the axis of rotation. The segments slide on radial spokes, which is disadvantageous. A belt which is guided over the peripheries of the segments must run between said spokes, and hence contacts the spokes and thus damage to the belt and an untrue running cannot be prevented. Furthermore the pulley is wide and heavy. The spokes prevent a desired small diameter of the disk.

An adjustable pulley with only arced guide grooves in the disks is known from French Pat. No. 22 36 393, wherein the segments on one side are equipped with two pegs.

German Pat. No. 12 86 680 also discloses a pulley in which the segments on one side have a guide rib.

Knowing these disadvantages, the basic purpose of the invention is to improve an adjustable pulley of the above-mentioned type so that at a given diameter about the axis which carries the pulley, and at a technically tolerable outside diameter of the disk, an as large as possible adjustment area and thus an as large as possible relationship between the belt speeds at a smallest and largest adjusted diameters—on the assumption of a constant drive speed of the disk—can be achieved, and wherein during the adjustment a tilting of the segments and their jamming between the loosened disks is reliably prevented.

The aforesaid purpose is attained inventively in a pulley of the above-identified type by the measures which are defined in the attached claims.

The inventive solution is thereby based on the recognition that the force couple, which during adjustment is responsible for the tilting inclination of each segment, is directed in such a manner that it tends to tilt the segment at an inclined angle with respect to the respective radial plane, which is defined by the associated radial guide groove. This results from the guide grooves in both disks, which grooves intersect one another at almost 90°, and the pegs which engage the guide grooves and which are positioned on the two front sides of the segments in different positions. Through the asymmetrical design of each segment and the positioning of its longer diagonal in approximately the tilting direction, the segment is very securely supported against tilting. The support forces of the two disks, as a consequence of the force couple, act just in the direction of the longer diagonal providing the largest, optimum lever arms opposing the tilting moment. This measure results in an even, jerkfree movement of the segments during adjustment. This also permits, as a positive secondary effect, the radial extent of the segments to be substantially shorter than in the case of the state of the art. From this results the special advantage that, at a given axial diameter and constant speed, a substantially greater speed range exists. Same is, compared with known adjustable pulleys, approximately 30% greater. Stated differently, a known pulley would require at a required inner working diameter of 90 mm., for a speed control range of 1:3, an outside diameter of 270 mm.; while with the present invention under the same conditions an inner working diameter of 60 mm. and an outside diameter of 180 mm. can be realized.

The asymmetrical form of the segments results, in spite of the small radial extent of the segments, in advantageously long side surfaces. A further desirable effect is that, during adjustment of the segments from a smallest working diameter to a larger one, the segments totally separate from one another after only a slight relative rotation of the disks, and additional friction loads between the long side surfaces of the segments no longer occur. In spite of this, the segments can be manufactured simply and form, all together, a smaller mass than the segments according to the state of the prior art. Through this the moments of inertia of the pulley—in relationship to the various working diameters—become smaller than is the case in the state of the art. The segmentlike shape of the support members (i.e. the segments), of course, does not need to correspond with an exact circular-ring segment. In the same manner it is also possible to use support members which have the shape of a trapezoid with uneven long sides. The upper narrow side of the trapezoid can then be concavely rounded for contact with the splined tube. Also conceivable are asymmetrical segments, the sides of which are tailored or constricted in a top view. Support members of an I-shape with a convexly arced, short upper cross bar, which are connected by a radial web, can also be used. It is important only that a shorter and a longer diagonal exists, and the corner points (end points of the cross bars) lie for support on the disks at intervals which are caused by the geometric shape of the support member.

Even though the optimum design of the segments and of the angles of intersection of their longer diagonals with respect to the radial plane can most advantageously be determined through empiric tests, the angle of intersection of the long diagonal and the spacial position of the tilting force couple depends very strongly on the "lead angle" of the spiral-shaped guide groove. The respectively favorable angle of intersection is determined as explained hereinafter.

BRIEF DESCRIPTION OF THE DRAWINGS

One exemplary embodiment of the subject matter of the invention will be discussed in more detail hereinafter in connection with the drawings, in which.

DETAILED DESCRIPTION

Figure 1:
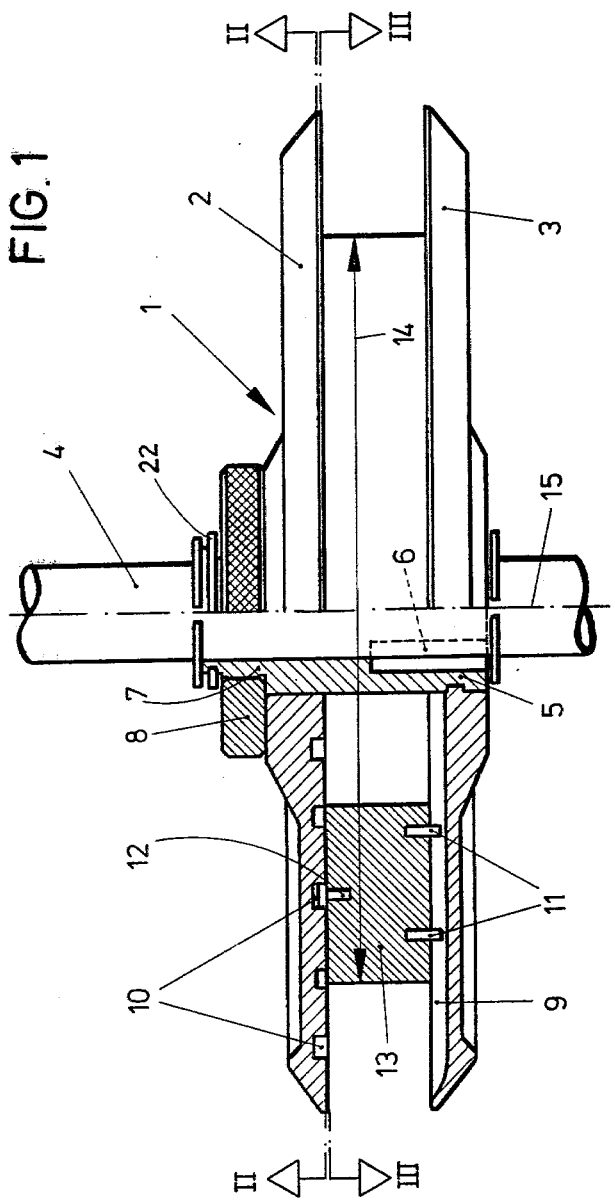
FIG. 1 is a side view of a pulley, one half being shown in cross section.
Figure 2:
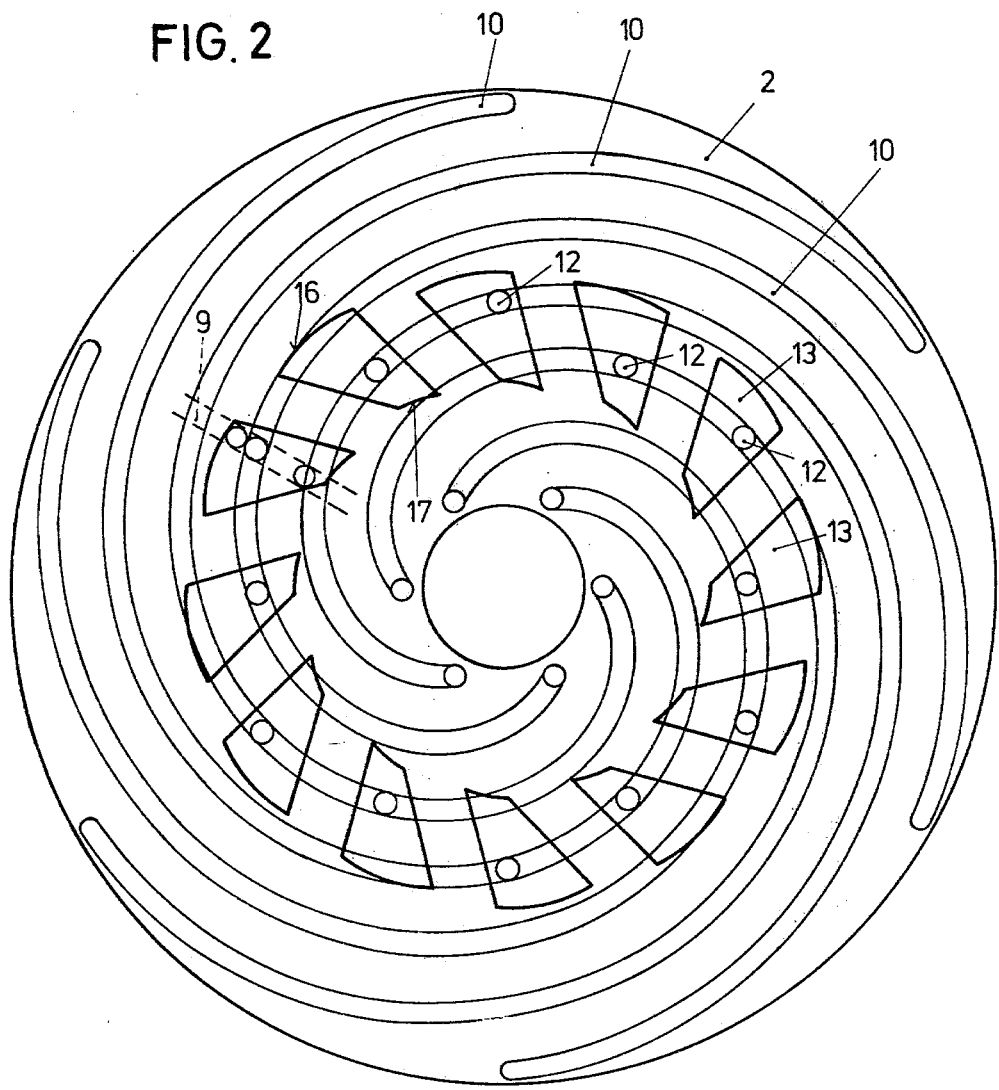
FIG. 2 is a radial cross-sectional view in the plane II—II of FIG. 1.
Figure 3:
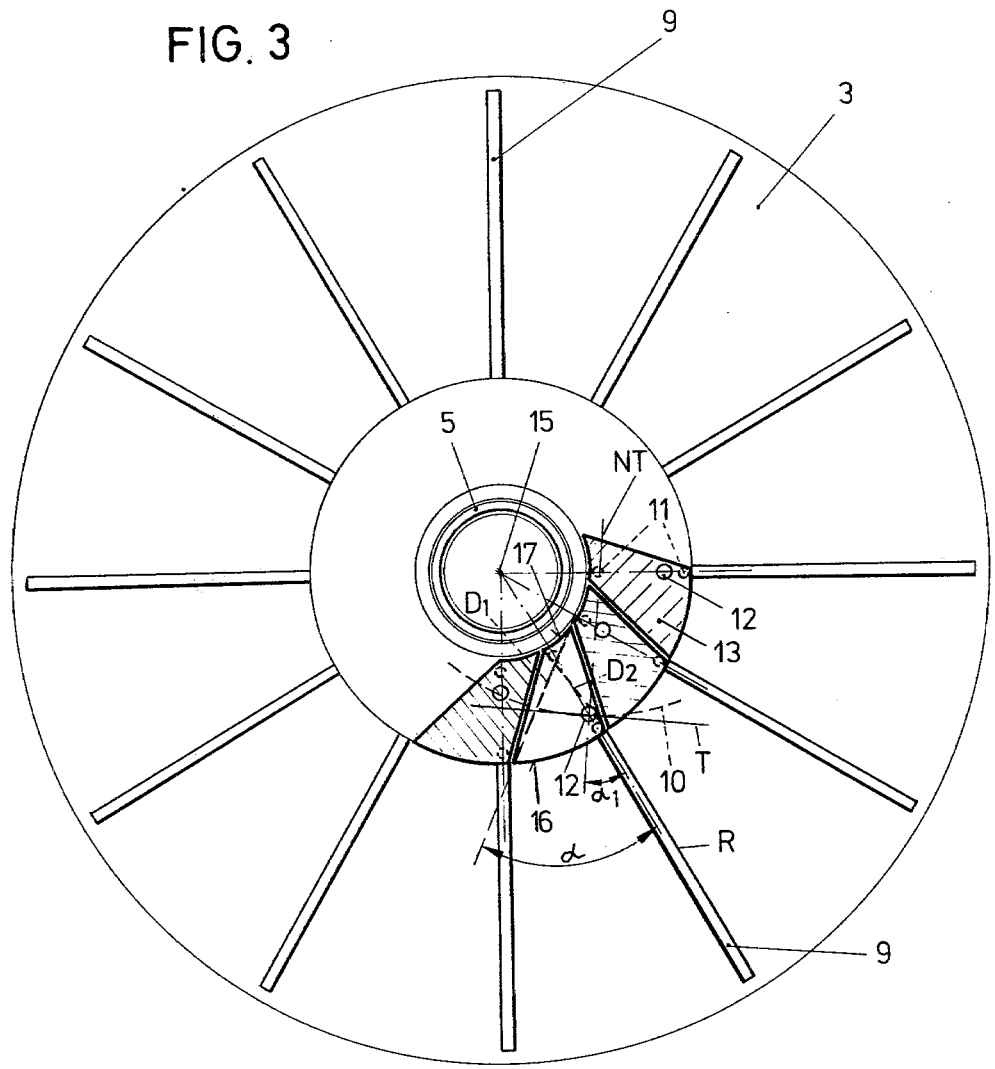
FIG. 3 is a cross-sectional view in the plane III—III of FIG. 1.

According to FIGS. 1 to 3, a pulley 1 consists of two disks 2 and 3 which are arranged spaced from one another, and which are supported on a common shaft 4 which, if desired, is driven by the respective machine. The disk 3 is connected rotationally fixed to a splined tube 5, which is coupled rotationally fixed with the shaft 4 by means of a spring or wedge 6. The splined tube 5, with an externally-threaded projection 7, extends through the disk 2. An adjusting nut 8 can be screwed onto the external thread 7 limited by a guard ring 22. The guard ring 22 secures the adjusting nut in its loosened position against falling off. The disk 3 has on its inside, radially extending guide grooves 9 (see FIG. 3), while the disk 2 has on its inside spiral-shaped extending guide grooves 10 (see FIG. 2) which start near its outer periphery and extend toward the center, namely the splined tube 5. Between the disks 2 and 3 there are support members 13 in the form of asymmetrical circular-ring segments (see FIGS. 2 and 3) arranged in a circular-ring shape, which segments have projecting pins or pegs 11 and 12 in their opposite front sides. Two pegs 11 are arranged spaced from one another on the one front side, which pegs engage the radial grooves 9 of the disk 3, while on the other front side there is arranged a single peg 12, which engages one of the spiral-shaped guide grooves 10. The working diameter which is defined by the entirety of the segments 13 is identified with reference numeral 14. It can be varied by rotating, after loosening the nut 8, the disk 2 relative to the disk 3, and by forcing the segments through a uniform radial movement along the guide grooves 9 due to the peg 12 which follows the course of the spiral-shaped guide groove 10. If a new working diameter 14 is adjusted, the nut 8 is again tightened so that the segments between the two disks are clamped and fixedly secured in position.

FIG. 2 is a top view of the inside of the disk 2, wherein the form of the segments 13 and the position of the pegs 12 can clearly be recognized. Each segment 13 has a back or radially outer peripheral area 16 which is circularly arced, wherein in the radially innermost position of the segments the center point of said circular arc lies on the longitudinal axis of the shaft 4, which longitudinal axis is identified with reference numeral 15, and thus on the axis of rotation of the pulley 1. In this manner the totality of the segments 13 define, with their back areas 16, a circular-ring periphery. However, in the position which is illustrated in FIG. 2, spaces exist between the individual adjacent segments in the peripheral direction. The arced curvature of the back areas corresponds with the smallest working diameter, namely a position in which all segments accumulate together with their radially inner, also arced, front areas 17 positioned in engagement with the outer periphery of the splined tube 5. Thus, the back areas 16 and the front areas 17 lie on concentric circles, the centerpoint of which is the axis of rotation 15 of the disks.

FIG. 3 clearly permits recognition of the asymmetrical design of the segments 13. Each segment 13 has, in this illustration, the design of an asymmetrical circular-ring segment with a long diagonal D1 and a short diagonal D2. As can be recognized in connection with the segment 13 of FIG. 3, which segment is not shown shaded, the segment has a radial extent which corresponds approximately with the width of the back area 16. Its shorter diagonal D2 extends approximately in the direction of a radial plane R which is defined by the associated radial guide groove 9, but it could also be inclined at a small angle, for example 30°, toward one or the other side of the radial plane. The long diagonal D1, however, is inclined at an angle $\alpha$ and intersects the radial plane R, so that an extension of the long diagonal passes by—in the drawing—to the right of the axis of rotation of the disks. The angle of intersection $\alpha$ of the long diagonal D1 is here greater than the angle of intersection $\alpha_1$, which is defined by a perpendicular $N_T$ to a tangent T with the spiral-shaped guide groove 10 at the point of intersection with the radial plane R (here being the position of the peg 12). The angle of intersection $\alpha$ could possibly amount to even 60° or more.

Figure 4:
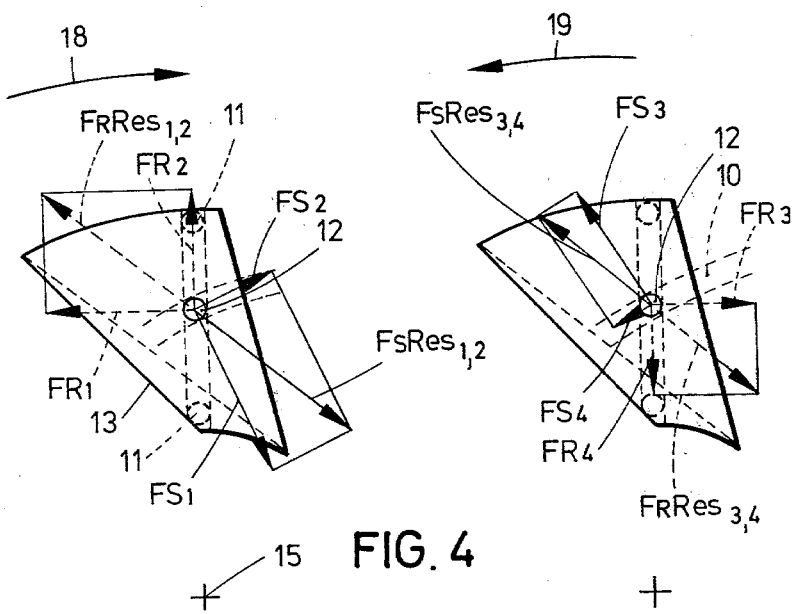
FIG. 4 is a schematic illustration of forces which are applied onto a support member during adjustment.

From FIG. 4 one can recognize the forces which act on each segment during adjustment, namely in a top view on the front side which carries the peg 12. In the left illustration, it is attempted to rotate the not illustrated upper disk 2, with its spiral-shaped grooves 10, in a clockwise direction (arrow 18). The disk 3 with the radial grooves 9 thereby holds the segment against rotating with the disk 2. Through this a force $F_{S1}$, which is directed perpendicularly with respect to the tangent to the spiral-shaped guide groove 10, and which tries to move the segment 13 inwardly, acts on the peg caused by its friction. A force $F_{S2}$ simultaneously acts on the peg 12—since the segment is held by the radial guide groove 9 of the disk 3—in a tangential direction—referred to the guide groove 10, which force $F_{S2}$ is formed from the torsional force of the disk 2 and the friction of the peg 12 in the guide groove 10. From these two forces results a force $F_S Res_{1,2}$, which extends at a sloped incline. A holding-back force $F_{R1}$ which lies perpendicular with respect to the radius and a radially directed holding-back force $F_{R2}$, which create a resulting force $F_R Res_{1,2}$, act on the two pegs 11 which are provided on the other front side of the segment and which engage the radial guide groove 11. Since the system is first without movement, $F_S Res_{1,2}$ and $F_R Res_{1,2}$ are of equal magnitude but are oppositely directed. $F_R Res_{1,2}$ was moved, for simplicity's sake, to the center of the line connected between the pegs 11. In this manner a force couple is created from each force which engages a front side of the segment, which tries in its active direction to tip the segment. Since, however, the longer diagonal D1 of the segment extends approximately in the direction of this force couple and thus the greatest support length of the segment exists in this direction, the tilting moment which is produced by the force couple is clearly counteracted. It has been proven in practice, that the position and the value of the force couple which is responsible for the tilting is additionally slightly influenced through the actual friction relationships, which can vary from the friction relationships which are theoretically the basis; however, the strongest tilting load occurs substantially in the plane in which also extends the longer diagonal D1.

The reversed relationships are shown in the right-hand illustration of FIG. 4 wherein the upper disk 2 is rotated counterclockwise (arrow 19) in order to adjust a larger working diameter. The force couple $F_SRes_{3,4}$ and $F_RRes_{3,4}$ which is responsible for the tilting is reversed in its active direction with respect to the left illustration. However, it again lies approximately in the plane in which also extends the long diagonal D1. Here too the tilting is opposed by the largest possible support surface. $R_SRes_{1,2}$ is not of the same magnitude as $F_SRes_{3,4}$, which, however, in this connection is of no importance.

Figure 5:
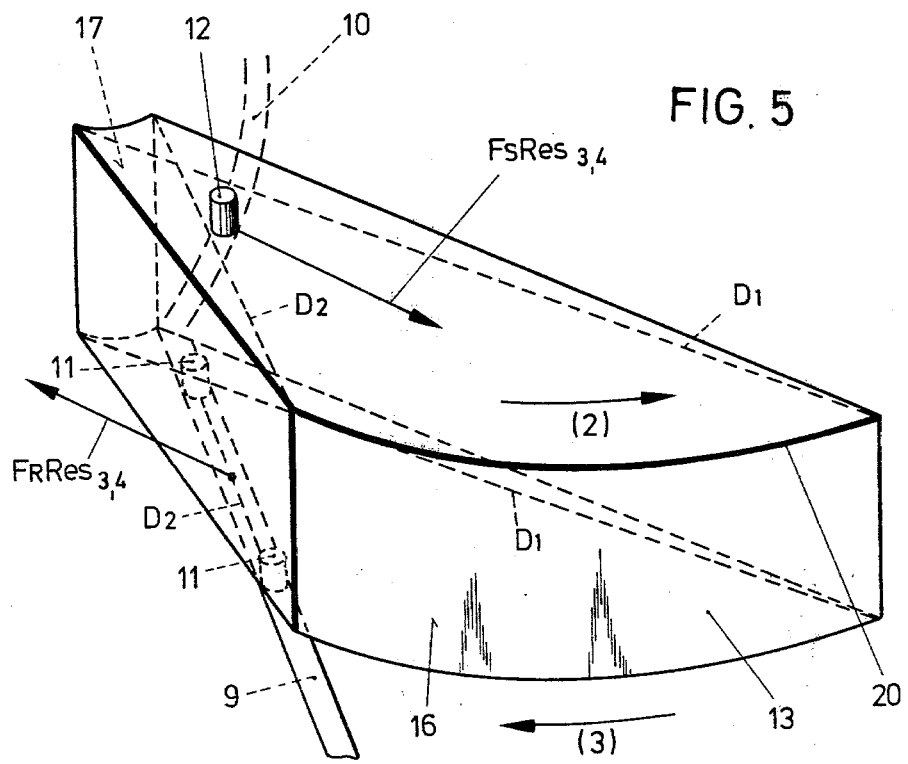
FIG. 5 is a perspective view of an individual support member with the effective tilting-force pair.

FIG. 5 shows the design of a segment 13 in an enlarged illustration. At the same time the three-dimensional relationship of the spiral-shaped guide groove 10 and of the radial guide groove 9 which cooperate with the segment 13 and the effective force couple $F_S{}^RRes_{3,4}$ can be recognized. The two pegs 11 on the lower front side of the segment 13, which pegs are designed for engagement with the radial guide groove 9, lie—since the shorter diagonal D2 extends approximately in the radial direction—aligned in the direction of the diagonal D2. The peg 12, which is provided on the upper front side and which is designed for engagement with the spiral-shaped guide groove 10, lies in the illustrated segment 13 approximately above the center of the connecting line of the pegs 11. This position, however, is purely accidental, since the radial position of the peg 12 depends on the course of the associated spiral-shaped guide groove 10. The arrows with the subscripts (2) (3) indicate the relative directions of rotation of the disks 2,3. The back area 16 of the segment 13 can be provided with an elastic and frictionally active coating 20, so that a good frictional connection can be created with respect to the belt or guide band which is placed around the pulley. Of course, the coating 20 can also be provided around the entire periphery of the segment 13—except for the two front sides.

In spite of the radially small extent of the segments 13, which results in a favorably small minimum working diameter, the tilting is counteracted through the position of the long diagonals of the segments so that a very sensitive and even adjustment of the segments can be achieved. Of course it would also be possible, to use in place of two pegs 11, several pegs which engage the radial groove 9. Theoretically it would, however, also be sufficient to use only one peg 11, which then should be designed, if desired, in its shape so that it reliably avoids a rotation of the segment with respect to the radial guide groove.

We claim:

1. A pulley with a variable working diameter, in particular a driving disk for the belt of a thread-delivery mechanism in textile machines, preferably knitting machines, including two coaxial disks which are rotatable relative to one another, of which the one has a radial guide groove and the other has at least one spiral-shaped guide groove, and a plurality of support members with a segment-like form which can be clamped between the disks in different positions so that their radially outer peripheral areas define a polygonal path which is similar to a circle, the support members having projections engaged in the guide grooves of both disks so that relative rotation of the disks moves the support members radially for changing the respective circle diameter, the improvement wherein each support member—viewed in the direction of the axis of rotation of the disks—has the shape of an asymmetrical circular-ring segment, the segment having a radially outer peripheral surface which is adapted for engagement with the belt, the segment—when viewed in the direction of the axis of rotation—having longer and shorter diagonals which extend from the circumferentially opposite ends of the outer peripheral surface, and wherein an extension of the longer diagonal is spaced from but passes by on the same side of the axis of rotation of the disks as a perpendicular to a tangent on the spiral-shaped guide groove in the area of the support member.

2. A pulley according to claim 1, wherein the projections on one side of two adjacent said support members each engage one said spiral-shaped guide groove, and wherein the projections on the other side of said two adjacent support members are engaged in different radial guide grooves.

3. A pulley according to claim 1, wherein said support members each define a segment of a circular ring so that, when said support members are moved into their radially innermost positions in engagement with one another, they define a circular ring which, by means of its outer periphery, defines the smallest working diameter of the pulley.

4. A pulley according to claim 1, wherein each support member has a radially inner peripheral surface and a pair of substantially planar side surfaces which extend between the opposite ends of the radially inner and outer peripheral surfaces, the longer and shorter diagonals joining the opposite outer ends of the inner and outer peripheral surfaces, both of said planar side surfaces being sloped in generally the same orientation relative to the radial direction so that linear extensions of both of these planar side surfaces are spaced from but pass by on the same side of the axis of rotation of the disks.

5. A pulley with a variable working diameter, in particular a driving disk for the belt of a thread-delivery mechanism in textile machines, preferably knitting machines, including two coaxial disks which are rotatable relative to one another, of which the one has a radial guide groove and the other has at least one spiral-shaped guide groove, and a plurality of support members with a segment-like form positioned between the disks in different positions so that their radially outer peripheral areas define a polygonal path which is similar to a circle, the support members having projections engaged in the guide grooves of both disks so that relative rotation of the disks moves the support members radially for changing the respective circle diameter, the improvement wherein each support member—viewed in the direction of the axis of rotation of the disks—has the shape of an asymmetrical segment, preferably a circular-ring segment, with a longer and a shorter diagonal, wherein an extension of the longer diagonal is spaced from but passes by on the same side of the axis of rotation of the disks as a perpendicular to a tangent on the spiral-shaped guide groove in the area of the support member, and wherein the shorter diagonal is positioned approximately radially with respect to the axis of rotation of the disks and the longer diagonal intersects a radial plane (R), which is defined by the radial guide groove which is associated with the support member, at an angle ($\alpha$) which is approximately of the same size or larger than an angle ($\alpha_1$), with which at the point of engagement of the projection in the spiral-shaped guide groove a perpendicular ($N_T$) with respect to the tangent (T) to the guide groove intersects the radial plane (R).

6. A pulley according to claim 5 including a high-friction elastic coating on at least the radially outer peripheral area of each segment.

7. A pulley according to claim 5 wherein the radial extent of each segment is approximately equal to the circumferentially extending length of the radially outer peripheral area.

8. A pulley according to claim 5, wherein the projections on one side of two adjacent said support members each engage one said spiral-shaped guide groove, and wherein the projections on the other side of said two adjacent support members are engaged in different radial guide grooves.

9. A pulley according to claim 5, wherein the projection associated with said radial guide groove prevents relative rotation between said radial guide groove and the respective support member, and wherein the projection associated with the spiral-shaped guide groove permits rotation of the respective support member relative thereto.

10. A pulley according to claim 1 or claim 4, wherein the radial extent of each segment is approximately equal to the circumferentially extending length of the outer peripheral surface.

11. In an adjustable pulley for providing a variable working diameter, including a pair of axially adjacent disks supported for rotation about an axis, said disks having opposed faces, the face on one of said disks having a plurality of radially extending grooves, the face on the other of said disks having a plurality of spiral-shaped grooves, and a plurality of support members positioned in angularly spaced relationship about said axis and disposed in operative connection between said disks, each said support member having first projection means thereon engaged with one of said radial grooves and second projection means thereon engaged with one of said spiral grooves, each said support member having an outer peripheral surface, the totality of the outer surfaces of said plurality of support members defining the working diameter, whereby relative rotation between said disks effects radial displacement of said support members to change the magnitude of said working diameter between a permissible minimum and maximum value, comprising the improvement wherein each support member—viewed in the direction of the axis of rotation of the disks—is shaped as an asymmetrical circular-ring segment, said plurality of segments when in their radially innermost position being disposed closely adjacent and in substantially abutting engagement with one another so as to effectively define a solid annular ring, said ring having an outer peripheral surface which is generated about the axis of rotation and is of a diameter equal to said minimum value, said segments also having a radially inner peripheral surface and a pair of substantially planar side surfaces which extend between the opposite ends of the radially inner and outer peripheral surfaces, each said segment being defined by first and second diagonals which join the opposite outer ends of the inner and outer peripheral surfaces, one diagonal being short in relationship to the other diagonal, the shorter diagonal extending approximately radially relative to the axis, and the longer diagonal extending at an angle of substantial magnitude relative to the shorter diagonal, and the first and second projection means as associated with the respective segment being located substantially on said shorter diagonal.

* * * * *

UNITED STATES PATENT AND TRADEMARK OFFICE
CERTIFICATE OF CORRECTION

PATENT NO. : 4 325 702
DATED : April 20, 1982
INVENTOR(S) : Kurt A. G. Jacobsson et al It is certified that error appears in the above—identified patent and that said Letters Patent is hereby corrected as shown below:

Claim 2 should be deleted.

Signed and Sealed this

Thirteenth Day of July 1982

[SEAL]

Attest:

Attesting Officer

GERALD J. MOSSINGHOFF
Commissioner of Patents and Trademarks